US012651968B2

(12) United States Patent
Chen et al.

(10) Patent No.: US 12,651,968 B2
(45) Date of Patent: Jun. 9, 2026

(54) SINGLE-INDUCTOR BIPOLAR-OUTPUT POWER CONVERTING CIRCUIT AND RELATED CONTROL METHOD

(71) Applicant: RICHTEK TECHNOLOGY CORP., Hsinchu County (TW)

(72) Inventors: Jung-Sheng Chen, Miaoli County (TW); Pei-Lin Chen, Tainan City (TW); Po-En Wang, Hsinchu County (TW); Hsing-Shen Huang, Hsinchu County (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 262 days.

(21) Appl. No.: 18/674,900

(22) Filed: May 26, 2024

(65) Prior Publication Data

US 2025/0239939 A1 Jul. 24, 2025

Related U.S. Application Data

(60) Provisional application No. 63/624,290, filed on Jan. 24, 2024.

(30) Foreign Application Priority Data

Apr. 22, 2024 (TW) ................................. 113114842

(51) Int. Cl.
*H02M 3/158* (2006.01)
*H02M 3/07* (2006.01)
(52) U.S. Cl.
CPC ............. *H02M 3/158* (2013.01); *H02M 3/07* (2013.01)

(58) Field of Classification Search
CPC ........ H02M 3/158; H02M 3/07; H02M 3/071; H02M 1/0095; H02M 1/08
See application file for complete search history.

(56) References Cited

U.S. PATENT DOCUMENTS

| | | | |
|---|---|---|---|
| 9,042,131 B2 | 5/2015 | Barron | |
| 10,014,778 B1 * | 7/2018 | Wei ...................... | H02M 3/1582 |
| 10,103,620 B1 * | 10/2018 | Wei ........................ | H02M 3/156 |
| 11,070,146 B2 | 7/2021 | Zmood | |
| 2010/0039080 A1 * | 2/2010 | Schoenbauer ...... | H02M 3/1582 |
| | | | 323/234 |

(Continued)

FOREIGN PATENT DOCUMENTS

CN 114244112 A 3/2022

*Primary Examiner* — Kyle J Moody
(74) *Attorney, Agent, or Firm* — Winston Hsu

(57) ABSTRACT

A power converting circuit includes an input end, two output ends, three nodes, a first switch coupled between the input end and the first node, a second switch coupled between the second node and a ground level, a third switch coupled between the third node and the ground level, a fourth switch coupled between the third node and the first output end, a fifth switch coupled between the second node and the second output end, a path control device, an inductor coupled between the first node and the third node, a first capacitor coupled between the first output end and the ground level, a second capacitor coupled between the second output end and the ground level, and a control circuit. The path control device adjusts the voltage difference between the first and the second nodes. The control circuit provides control signals for selectively turning on or turning off the switches.

18 Claims, 6 Drawing Sheets

(56)     References Cited

U.S. PATENT DOCUMENTS

| 2021/0050786 A1* | 2/2021 | Park | ......................... H02M 3/07 |
| 2022/0271673 A1 | 8/2022 | Fogel | |
| 2023/0123325 A1 | 4/2023 | Zmood | |

\* cited by examiner

SINGLE-INDUCTOR BIPOLAR-OUTPUT POWER CONVERTING CIRCUIT AND RELATED CONTROL METHOD

CROSS REFERENCE TO RELATED APPLICATIONS

This application claims the benefit of U.S. Provisional Application No. 63/624,290, filed on Jan. 24, 2024. The content of the application is incorporated herein by reference.

BACKGROUND OF THE INVENTION

1. Field of the Invention

The present invention is related to a power converting circuit and related control method, and more particularly, to a single-inductor bipolar-output power converting circuit with improved power conversion efficiency and related control method.

2. Description of the Prior Art

Generally speaking, when the operation of a back-end circuit demands positive and negative voltages from a power supply, a power converting circuit may be used for stepping down an input voltage, thereby generating a corresponding stepped-down positive output voltage and a corresponding stepped-down negative output voltage. For example, active-matrix organic light-emitting diode (AMOLED) display panels and audio amplifiers, which are common in mobile display applications, require both positive and negative polarity power supplies, and thus often adopt a single-inductor bipolar-output (SIBO) DC-DC power converting circuit. A SIBO power converting circuit is configured to provide different energy paths using a single inductor and multiple switches, thereby converting the input voltage into two output voltages having opposite polarities.

Therefore, there is a need of improving the power conversion efficiency of the SIBO power converting circuit.

SUMMARY OF THE INVENTION

The present invention provides a SIBO power converting circuit which includes an input end for receiving an input voltage, a first output end for outputting a first output voltage, a second output end for outputting a second output voltage, a first through a third nodes, a first through a fifth switches, a path control device, an inductor coupled between the first node and the third node, a first capacitor, a second capacitor, and a control circuit. The first switch includes a first end coupled to the input end, a second end coupled to the first node, and a control end for receiving a first control signal. The second switch includes a first end coupled to the second node, a second end coupled to a ground level, and a control end for receiving a second control signal. The third switch includes a first end coupled to the third node, a second end coupled to the ground level, and a control end for receiving a third control signal. The fourth switch includes a first end coupled to the third node, a second end coupled to the first output end, and a control end for receiving a fourth control signal. The fifth switch includes a first end coupled to the second node, a second end coupled to the second output end, and a control end for receiving a fifth control signal. The path control device is coupled between the first node and the second node and configured to adjust a voltage difference between the first node and the second node. The first capacitor includes a first end coupled to the first output end and a second end coupled to the ground level. The second capacitor includes a first end coupled to the second output end and a second end coupled to the ground level. The control circuit is configured to provide the first control signal, the second control signal, the third control signal, the fourth control signal and the fifth control signal.

The present invention also provides a method of controlling a SIBO power converting circuit which includes an input end for receiving an input voltage, a first output end for outputting a first output voltage, a second output end for outputting a second output voltage, a first node, a second node, a third node, a first switch coupled between the input end and the first node, a second switch coupled between the second node and a ground level, a third switch coupled between the third node and the ground level, a fourth switch coupled between the third node and the first output end, a fifth switch coupled between the second node and the second output end, a first flying capacitor coupled between the first node and the second node, an inductor coupled between the first node and the third node, a first capacitor coupled between the first output end and the ground level, and a second capacitor coupled between the second output end and the ground level. The method includes turning on the first switch, the second switch and the third switch and turning off the fourth switch and the fifth switch during a first operation phase, thereby allowing the input voltage to charge the inductor and the first flying capacitor; turning on the first switch and the fourth switch and turning off the second switch, the third switch and the fifth switch during a second operation phase, thereby allowing energy stored in the inductor to charge the first capacitor for establishing the first output voltage at the first output end; and turning on the third switch and the fifth switch and turning off the first switch, the second switch and the fourth switch during a third operation phase, thereby allowing energy stored in the inductor and the first flying capacitor to charge the second capacitor for establishing the second output voltage at the second output end.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
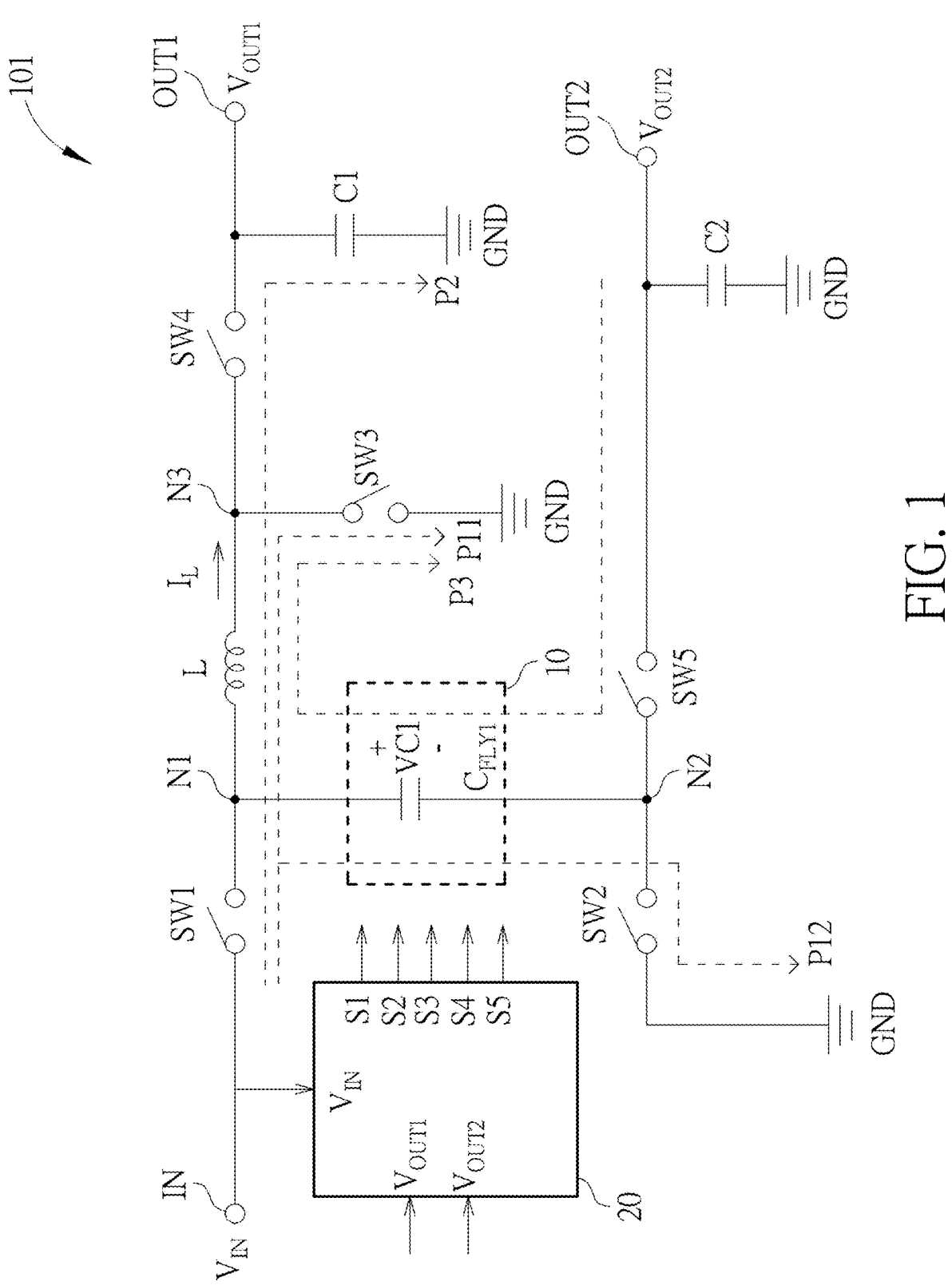
FIG. 1 is a diagram illustrating a SIBO power converting circuit according to an embodiment of the present invention.

FIGS. 1-6 are diagrams illustrating SIBO power converting circuits 101-106 according to embodiments of the present invention. Each of the SIBO power converting circuits 101-106 includes an input end IN, a first output end OUT1, a second output end OUT2, nodes N1-N3, an inductor L, switches SW1-SW5, capacitors C1-C2, a path control device 10, and a control circuit 20. Each of the SIBO power converting circuits 101-106 is configured to receive an input voltage $V_{IN}$ via its input end IN and perform power conversion on the input voltage $V_{IN}$, thereby providing a first output voltage $V_{OUT1}$ at its first output end OUT1 and a second output voltage $V_{OUT2}$ at its second output end OUT2, wherein the first output voltage $V_{OUT1}$ is a positive voltage and the second output voltage $V_{OUT2}$ is a negative voltage.

In the SIBO power converting circuits 101-106, the switch SW1 includes a first end coupled to the input end IN, a second end coupled to the node N1, and a control end coupled to the control circuit 20 for receiving a control signal S1. The switch SW1 may be selectively turned on or turned off based on the control signal S1, thereby controlling the signal transmission path between the input end IN and the node N1. The switch SW2 includes a first end coupled to the node N2, a second end coupled to a ground level GND, and a control end coupled to the control circuit 20 for receiving a control signal S2. The switch SW2 may be selectively turned on or turned off based on the control signal S2, thereby controlling the signal transmission path between the node N1 and the ground level. The switch SW3 includes a first end coupled to the node N3, a second end coupled to the ground level GND, and a control end coupled to the control circuit 20 for receiving a control signal S3. The switch SW3 may be selectively turned on or turned off based on the control signal S3, thereby controlling the signal transmission path between the node N3 and the ground level GND. The switch SW4 includes a first end coupled to the node N3, a second end coupled to the first output end OUT1, and a control end coupled to the control circuit 20 for receiving a control signal S4. The switch SW4 may be selectively turned on or turned off based on the control signal S4, thereby controlling the signal transmission path between the node N3 and the first output end OUT1. The switch SW5 includes a first end coupled to the node N2, a second end coupled to the second output end OUT2, and a control end coupled to the control circuit 20 for receiving a control signal S5. The switch SW5 may be selectively turned on or turned off based on the control signal S5, thereby controlling the signal transmission path between the node N2 and the second output end OUT2. The inductor L is coupled between the nodes N1 and the node N3 and configured to generate self-induction electromotive force in response to the voltage difference between the nodes N1 and N3, thereby adjusting the value of the inductor current $I_L$. The capacitor C1 includes a first end coupled to the first output end OUT1 and a second end coupled to the ground level GND for storing the energy of the first output voltage $V_{OUT1}$. The capacitor C2 includes a first end coupled to the second output end OUT2 and a second end coupled to the ground level GND for storing the energy of the second output voltage $V_{OUT2}$.

The path control device 10 includes a first end coupled to the node N1 and a second end coupled to the node N2, and is configured to adjust the voltage difference between the nodes N1 and N2. In the SIBO power converting circuits 101-105 depicted in FIGS. 1-5, the path control device 10 is implemented using a flying capacitor $C_{FLY1}$ which includes a first end coupled to the node N1 and a second end coupled to the node N2, and is configured to adjust the voltage difference between the nodes N1 and N2 based on the status of each switch. In the SIBO power converting circuit 106 depicted in FIG. 6, the path control device 10 is implemented using a switch SW0 which includes a first end coupled to the node N1, a second end coupled to the node N2 and a control end coupled to the control circuit 20 for receiving a control signal S0, and is configured to selectively couple the node N1 to the node N2 based on the control signal S0, thereby adjusting the voltage difference between the nodes N1 and N2.

Figure 2:
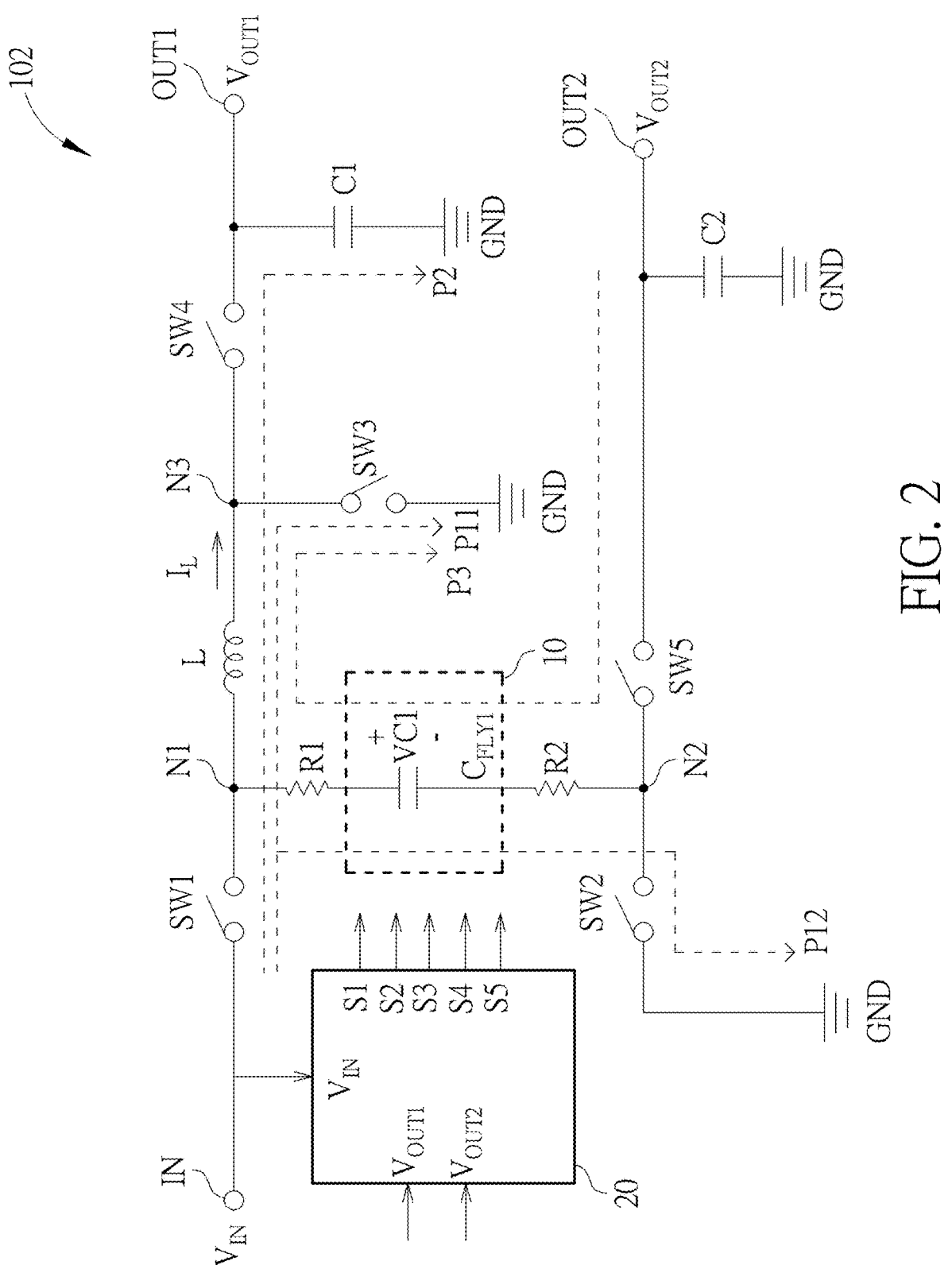
FIG. 2 is a diagram illustrating a SIBO power converting circuit according to another embodiment of the present invention.

In the embodiment depicted in FIG. 2, the SIBO power converting circuit 102 further includes at least one resistor coupled in series to the path control device 10. FIG. 2 depicts the embodiment of two resistors, wherein a resistor R1 is coupled between the node N1 and the first end of the flying capacitor $C_{FLY}$, and a resistor R2 is coupled between the node N2 and the second end of the flying capacitor $C_{FLY}$. However, the number of resistors coupled in series to the path control device 10 does not limit the scope of the present invention.

Figure 3:
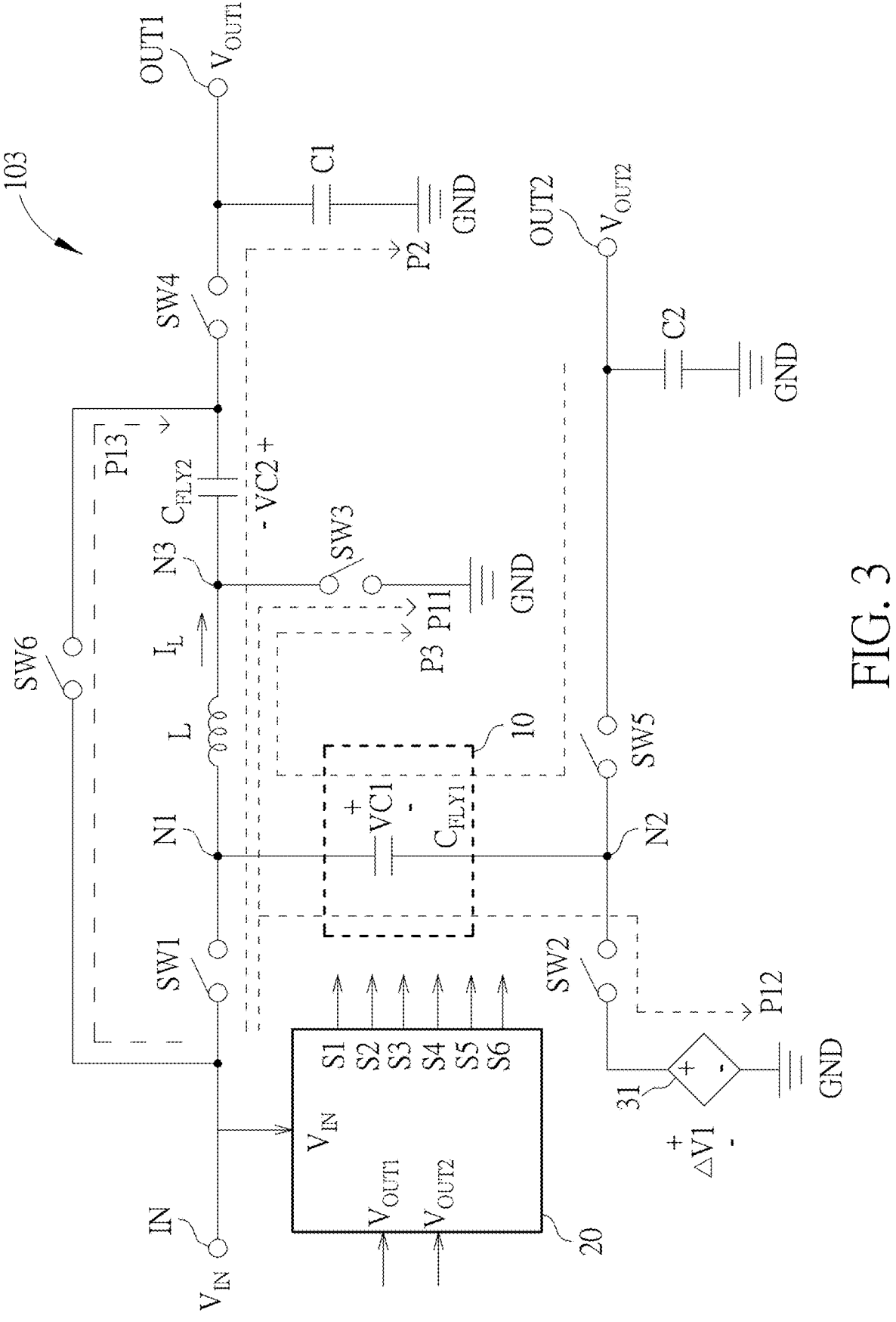
FIG. 3 is a diagram illustrating a SIBO power converting circuit according to another embodiment of the present invention.

In the embodiment depicted in FIG. 3, the SIBO power converting circuit 103 further includes a flying capacitor $C_{FLY2}$ and a switch SW6. The flying capacitor $C_{FLY2}$ includes a first end coupled to the first end of the switch SW4 and a second end coupled to the node N3, wherein VC2 represents the voltage established across the first end and the second end of the flying capacitor $C_{FLY2}$. The switch SW6 include a first end coupled to the input end IN, a second end coupled between the first end of the flying capacitor $C_{FLY2}$ and the first end of the switch SW4, and a control end coupled to the control circuit 20 for receiving a control signal S6. The switch SW6 is selectively turned on or turned off based on the control signal S6, thereby controlling the signal transmission path between the input end IN and the first end of the switch SW4.

Figure 4:
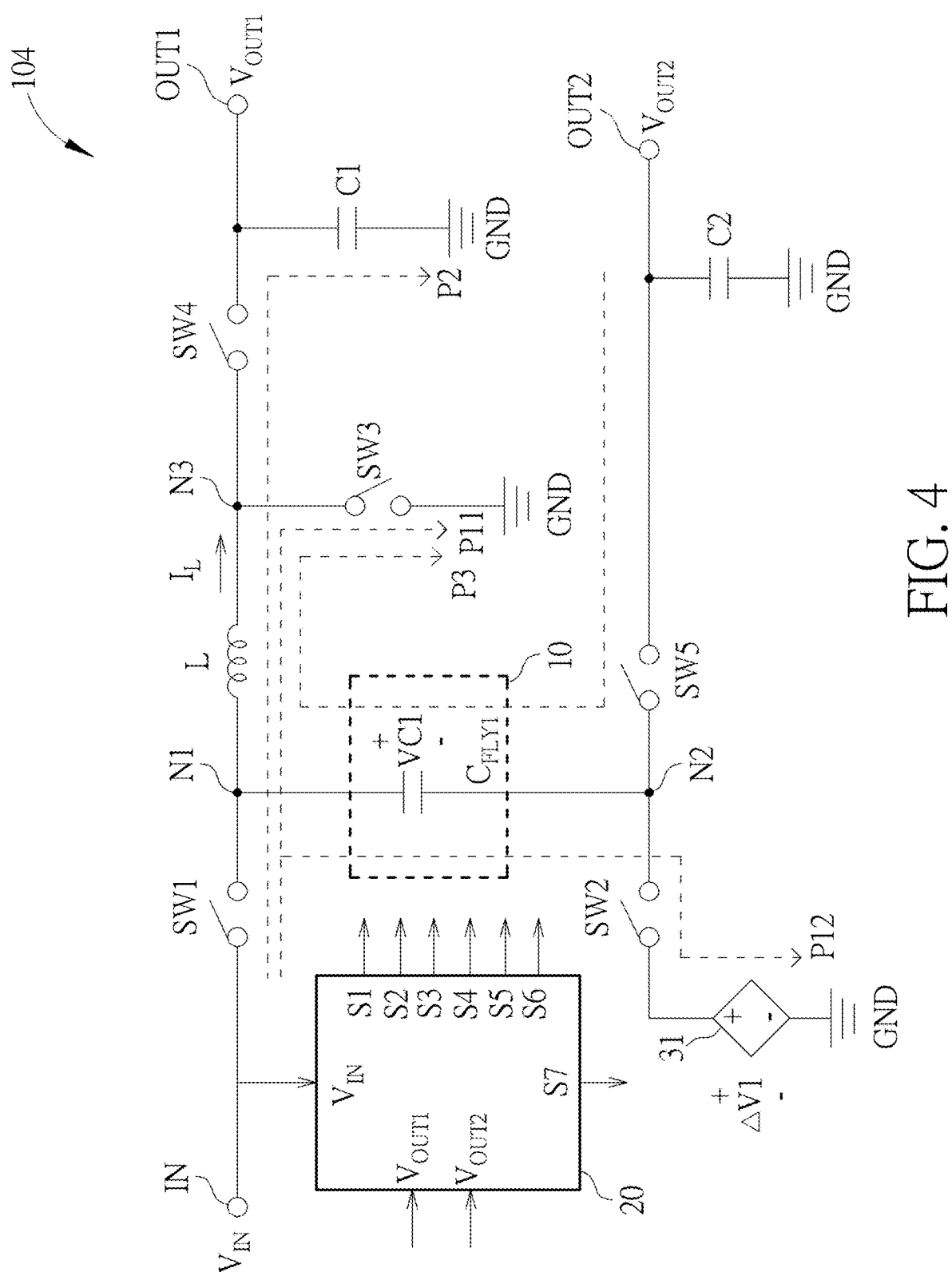
FIG. 4 is a diagram illustrating a SIBO power converting circuit according to another embodiment of the present invention.

In the embodiment depicted in FIG. 4, the SIBO power converting circuit 104 further includes an adjustable voltage source 31 coupled between the second end of the switch SW2 and the ground level GND. The adjustable voltage source 31 is configured to adjust the voltage established across its first and second ends based on a control signal S7 provided by the control circuit 20, thereby providing a first compensation voltage $\Delta V1$.

Figure 5:
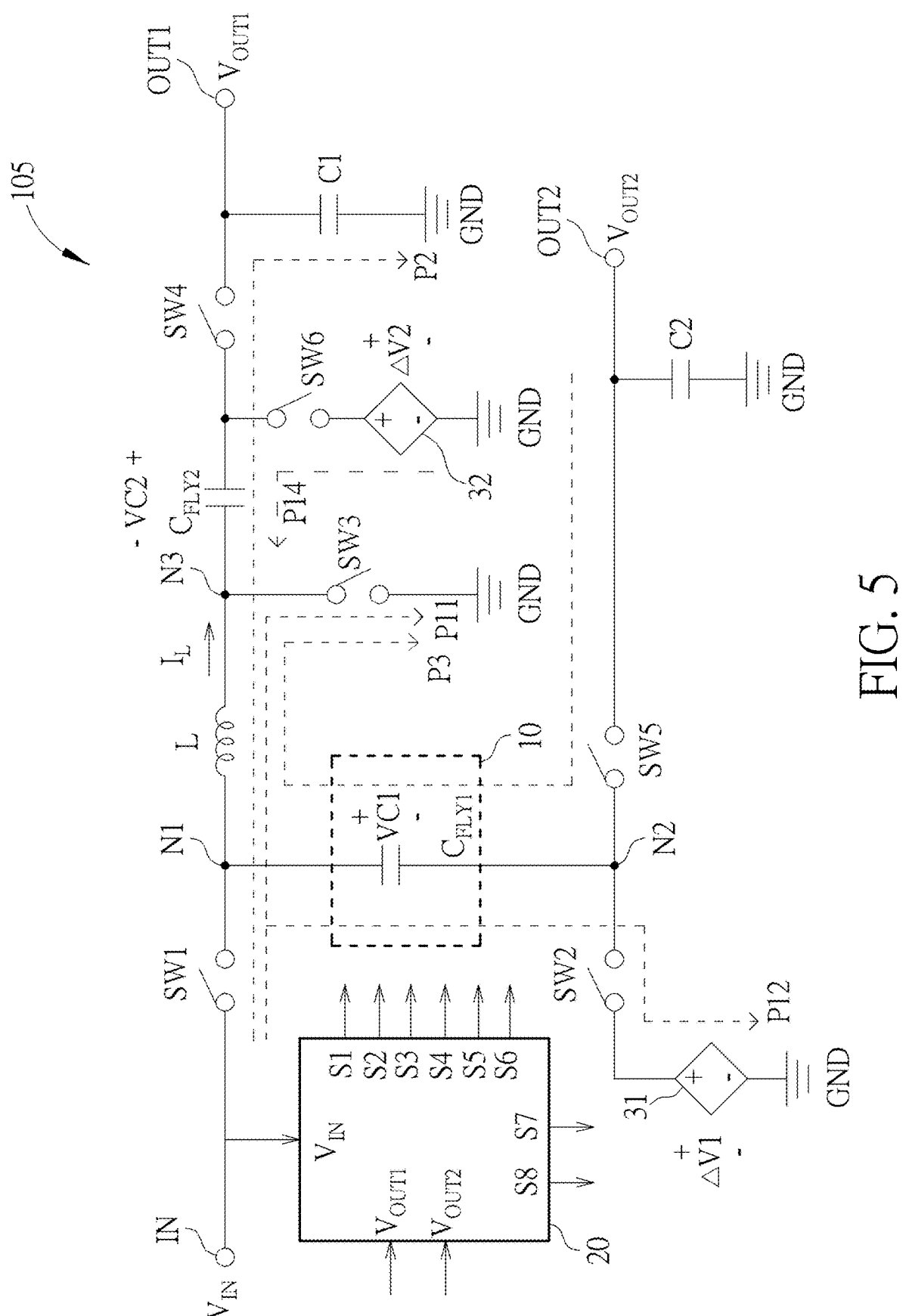
FIG. 5 is a diagram illustrating a SIBO power converting circuit according to another embodiment of the present invention.

In the embodiment depicted in FIG. 5, the SIBO power converting circuit 105 further includes a flying capacitor $C_{FLY2}$, a switch SW6 and adjustable voltage sources 31 and 32. The flying capacitor $C_{FLY2}$ includes a first end coupled to the first end of the switch SW4 and a second end coupled to the node N3, wherein VC2 represents the voltage established across the first end and the second end of the flying capacitor $C_{FLY2}$. The switch SW6 include a first end coupled between the first end of the flying capacitor $C_{FLY2}$ and the first end of the switch SW4, a second end coupled to the adjustable voltage source 32, and a control end coupled to the control circuit 20 for receiving a control signal S6. The switch SW6 is selectively turned on or turned off based on the control signal S6, thereby controlling the signal transmission path between the adjustable voltage source 32 and the first end of the flying capacitor $C_{FLY2}$. The adjustable voltage source 31 is coupled between the second end of the switch SW2 and the ground level GND, and is configured to adjust the voltage established across its first and second ends based on a control signal S7 provided by the control circuit 20, thereby providing a first compensation voltage $\Delta V1$. The adjustable voltage source 32 is coupled between the second end of the switch SW6 and the ground level GND, and is configured to adjust the voltage established across its first and second ends based on a control signal S8 provided by the control circuit 20, thereby providing a second compensation voltage $\Delta V2$.

Figure 6:
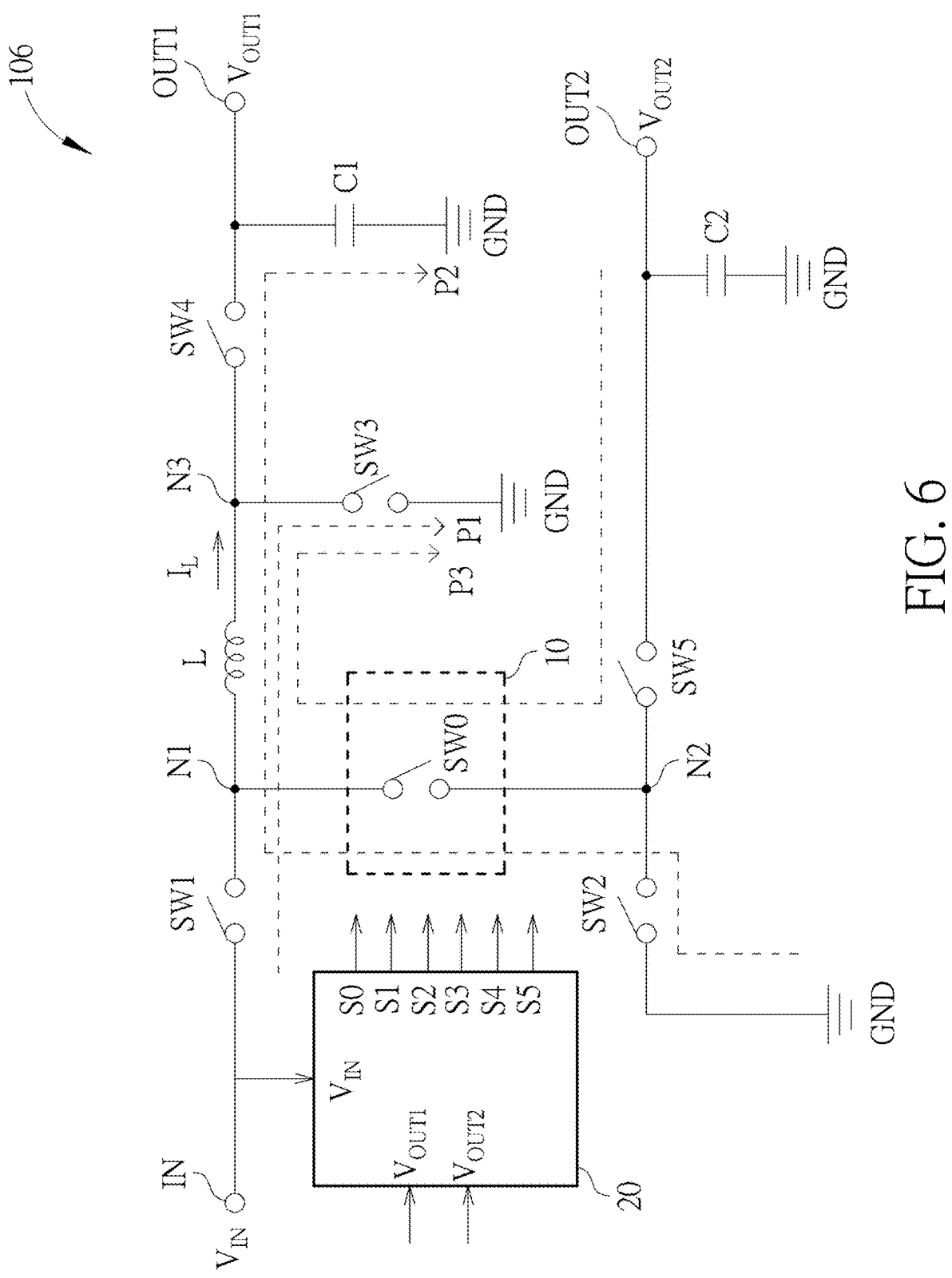
FIG. 6 is a diagram illustrating a SIBO power converting circuit according to another embodiment of the present invention.

In the embodiment depicted in FIG. 6, the path control device 10 of the SIBO power converting circuit 106 is implemented using a switch SW0 which includes a first end coupled to the node N1, a second end coupled to the node N2 and a control end coupled to the control circuit 20 for receiving a control signal S0. The switch SW0 is configured to selectively couple the node N1 to the node N2 based on the control signal S0, thereby adjusting the voltage difference between the nodes N1 and N2.

In the present invention, the control signal S1 periodically switches between a first enable level and a first disable level based on a first duty cycle, the control signal S2 periodically switches between a second enable level and a second disable level based on a second duty cycle, the control signal S3 periodically switches between a third enable level and a third disable level based on a third duty cycle, the control signal S4 periodically switches between a fourth enable level and a fourth disable level based on a fourth duty cycle, the control signal S5 periodically switches between a fifth enable level and a fifth disable level based on a fifth duty cycle, the control signal S6 periodically switches between a sixth enable level and a sixth disable level based on a sixth duty cycle, and the control signal S0 periodically switches between a seventh enable level and a seventh disable level based on a seventh duty cycle. In the present invention, the control signals may have the same enable level and the same disable level, or different enable levels and disable levels. In an embodiment, the control circuit 20 is configured to adjust the duty cycle of each switch based on the input voltage $V_{IN}$, the first output voltage $V_{OUT1}$ and the second output voltage $V_{OUT2}$.

In the present invention, the operation of each SIBO power converting circuit includes 3 operation phases. The commonality between the operations of the SIBO power converting circuits 101-106 is explained using the SIBO power converting circuit 101 as an example.

In the first operation phase of the SIBO power converting circuit 101, the control circuit 20 is configured to output the control signals S1-S3 having respective enable levels for turning on the switches SW1-SW3 and output the control signals S4-S5 having respective disable levels for turning off the switches SW4-SW5. Under such circumstance, the energy of the input voltage $V_{IN}$ may be transmitted to the ground level GND via the switch SW1, the inductor L and the switch SW3, thereby charging the inductor L, wherein the corresponding energy path is designated by a dotted arrow symbol P11. On the other hand, the energy of the input voltage $V_{IN}$ may also be transmitted to the ground level GND via the switch SW1, the flying capacitor $C_{FLY1}$ and the switch SW2, thereby charging the flying capacitor $C_{FLY1}$, Wherein the corresponding energy path is designated by a dotted arrow symbol P12 and the voltage VC2 established across the flying capacitor $C_{FLY1}$ is equal to $V_{IN}$. Therefore, the first operation phase of the SIBO power converting circuit 101 is the charging stage of the inductor L and the flying capacitor $C_{FLY1}$.

In the second operation phase of the SIBO power converting circuit 101, the control circuit 20 is configured to output the control signals S1 and S4 having respective enable levels for turning on the switches SW1 and SW4 and output the control signals S2, S3 and S5 having respective disable levels for turning off the switches SW2, SW3 and SW5. Under such circumstance, the inductor current $I_L$ may flow from the inductor L to the ground level GND via the switch SW4 and the capacitor C1, wherein the corresponding energy path is designated by a dotted arrow symbol P2. In other words, the energy stored in the inductor L may charge the capacitor C1 via its first end, thereby establishing the first output voltage $V_{OUT1}$ at the first output end OUT1. Therefore, the second operation phase is the positive output energizing operation stage of the SIBO power converting circuit 101, wherein the discharging slope of the inductor current $I_L$ is equal to $V_{OUT1}/L$.

In the third operation phase of the SIBO power converting circuit 101, the control circuit 20 is configured to output the control signals S3 and S5 having respective enable levels for turning on the switches SW3 and SW5 and output the control signals S1, S2 and S4 having respective disable levels for turning off the switches SW1, SW2 and SW4. Under such circumstance, the energy stored in the flying capacitor $C_{OUT1}$ and the inductor L may be transmitted to the ground level GND via the switch SW3. In other words, the energy stored in the flying capacitor $C_{FLY1}$ and the inductor L may charge the capacitor C2 via its second end, thereby establishing the second output voltage $V_{OUT2}$ at the second output end OUT2, wherein the corresponding energy path is designated by a dotted arrow symbol P3. Therefore, the third operation phase is the negative output energizing operation stage of the SIBO power converting circuit 101, wherein the discharging slope of the inductor current $I_L$ is equal to $(V_{OUT2}+V_{IN})/L$.

Regarding the embodiment depicted in FIG. 2, the operation of the SIBO power converting circuit 102 is similar to that of the SIBO power converting circuit 101. However, the SIBO power converting circuit 102 is able to control the discharging slope of the inductor current $I_L$ in the third operation phase more accurately using the current-limiting resistors R1 and R2.

Regarding the embodiment depicted in FIG. 3, in the first operation phase of the SIBO power converting circuit 103, the control circuit 20 is configured to output the control signals S1-S3 and S6 having respective enable levels for turning on the switches SW1-SW3 and SW6 and output the control signals S4-S5 having respective disable levels for turning off the switches SW4-SW5. Therefore, in addition to the previously mentioned energy paths P11 and P12, the first end of the flying capacitor $C_{FLY2}$ is coupled to the input voltage $V_{IN}$ via the switch SW6, and the second end of the flying capacitor $C_{FLY2}$ is coupled to the ground level GND via the switch SW3, wherein the voltage VC2 established across the flying capacitor $C_{FLY2}$ is equal to $V_{IN}$ and the corresponding energy path is designated by a dotted arrow symbol P13.

In the second operation phase of the SIBO power converting circuit 103, the control circuit 20 is configured to output the control signals S1 and S4 having respective enable levels for turning on the switches SW1 and SW4 and output the control signals S2-S3 and S5-S6 having respective disable levels for turning off the switches SW2-SW3 and SW5-SW6. Under such circumstance, the inductor current $I_L$ may flow from the inductor L to the ground level GND via the flying capacitor $C_{FLY2}$, the switch SW4 and the capacitor C1, thereby establishing the first output voltage $V_{OUT1}$ at the first output end OUT1, wherein the corresponding energy path is designated by a dotted arrow symbol P2. The voltage VC2 established across the flying capacitor $C_{FLY2}$ may reduce the root mean square (RMS) current of the inductor L. That is, the discharging slope of the inductor current $I_L$ in the second operation phase may be adjusted to $(V_{IN}-V_{OUT1})/L$, thereby improving the power conversion efficiency of the second operation phase.

In the third operation phase of the SIBO power converting circuit 103, the control circuit 20 is configured to output the control signals S3 and S5 having respective enable levels for turning on the switches SW3 and SW5 and output the control signals S1-S2, S4 and S6 having respective disable levels for turning off the switches SW1-SW2, SW4 and SW6. Under such circumstance, the energy stored in the flying capacitor $C_{FLY1}$ and the inductor L may be transmitted to the ground level GND via the switch SW3. In other words, the energy stored in the flying capacitor $C_{FLY1}$ and the inductor L may charge the capacitor C2 via its second end, thereby establishing the second output voltage $V_{OUT2}$ at the second output end OUT2, wherein the corresponding energy path is designated by a dotted arrow symbol P3, and the discharging slope of the inductor current $I_L$ in the third operation phase is equal to $(V_{OUT2}+V_{IN})/L$.

Regarding the embodiment depicted in FIG. 4, the operation of the SIBO power converting circuit 104 is similar to that of the SIBO power converting circuit 101. However, the adjustable voltage source 31 may adjust the voltage established across its first and second ends based on the control signal S7 provided by the control circuit 20, thereby providing the first compensation voltage $\Delta V1$. In the first operation phase of the SIBO power converting circuit 104 when the switches SW1 and SW2 are turned on, the first compensation voltage $\Delta V1$ provided by the adjustable voltage source 31 in the energy path P12 may adjust the voltage VC1 established across the flying capacitor $C_{FLY1}$ ($VC1=V_{IN}-\Delta V1$). This way, in the third operation phase of the SIBO power converting circuit 104 when the switches SW3 and SW5 are turned on, the discharging slope of the inductor current $I_L$ along the energy path P3 may be adjusted to $(V_{OUT2}+V_{IN}-\Delta V1)/L$.

Regarding the embodiment depicted in FIG. 5, in the first operation phase of the SIBO power converting circuit 105, the control circuit 20 is configured to output the control signals S1-S3 and S6 having respective enable levels for turning on the switches SW1-SW3 and SW6 and output the control signals S4-S5 having respective disable levels for turning off the switches SW4-SW5. Therefore, in addition to the previously mentioned energy paths P11 and P12, the first end of the flying capacitor $C_{FLY2}$ may be coupled to the adjustable voltage source 32 via the switch SW6, and the second end of the flying capacitor $C_{FLY2}$ may be coupled to the ground level GND via the switch SW3, wherein the corresponding energy path is designated by a dotted arrow symbol P14. In the first operation phase of the SIBO power converting circuit 105, the first compensation voltage $\Delta V1$ provided by the adjustable voltage source 31 in the energy path P12 may adjust the voltage VC1 established across the flying capacitor $C_{FLY1}$ ($VC1=V_{IN}-\Delta V1$), and the second compensation voltage $\Delta V2$ provided by the adjustable voltage source 32 in the energy path P14 may adjust the voltage VC2 established across the flying capacitor $C_{FLY2}$ ($VC2=\Delta V2$).

In the second operation phase of the SIBO power converting circuit 105, the control circuit 20 is configured to output the control signals S1 and S4 having respective enable levels for turning on the switches SW1 and SW4 and output the control signals S2-S3 and S5-S6 having respective disable levels for turning off the switches SW2-SW3 and SW5-SW6. Under such circumstance, the inductor current $I_L$ may flow from the inductor L to the ground level GND via the flying capacitor $C_{FLY2}$, the switch SW4 and the capacitor C1, thereby establishing the first output voltage $V_{OUT1}$ at the first output end OUT1, wherein the corresponding energy path is designated by a dotted arrow symbol P2. The voltage VC2 established across the flying capacitor $C_{FLY2}$ may reduce the RMS current of the inductor L. That is, the discharging slope of the inductor current $I_L$ in the second operation phase of the SIBO power converting circuit 105 may be adjusted to $(\Delta V2-V_{OUT1})/L$, thereby improving the power conversion efficiency of the second operation phase.

In the third operation phase of the SIBO power converting circuit 105, the control circuit 20 is configured to output the control signals S3 and S5 having respective enable levels for turning on the switches SW3 and SW5 and output the control signals S1-S2, S4 and S6 having respective disable levels for turning off the switches SW1-SW2, SW4 and SW6. Under such circumstance, the energy stored in the flying capacitor $C_{FLY1}$ and the inductor L may be transmitted to the ground level GND via the switch SW3. In other words, the energy stored in the flying capacitor $C_{FLY1}$ and the inductor L may charge the capacitor C2 via its second end, thereby establishing the second output voltage $V_{OUT2}$ at the second output end OUT2, wherein the corresponding energy path is designated by a dotted arrow symbol P3, and the discharging slope of the inductor current $I_L$ in the third operation phase is equal to $(V_{OUT2}+V_{IN}-\Delta V1)/L$.

Regarding the embodiment depicted in FIG. 6, in the first operation phase of the SIBO power converting circuit 106, the control circuit 20 is configured to output the control signals S1 and S3 having respective enable levels for turning on the switches SW1 and SW3 and output the control signals S0, S2 and S4-S5 and having respective disable levels for turning off the switches SW0, SW2 and SW4-SW5. Under such circumstance, the energy of the input voltage $V_{IN}$ may be transmitted to the ground level GND via the switch SW1, the inductor L and the switch SW3, thereby charging the inductor L, wherein the corresponding energy path is designated by a dotted arrow symbol P1. Therefore, the first operation phase of the SIBO power converting circuit 106 is the charging stage of the inductor L.

In the second operation phase of the SIBO power converting circuit 106, the control circuit 20 is configured to output the control signals S0, S2 and S4 having respective enable levels for turning on the switches SW0, SW2 and SW4 and output the control signals S1, S3 and S5 having respective disable levels for turning off the switches SW1, SW3 and SW5. Under such circumstance, the inductor current $I_L$ may flow from the inductor L to the ground level GND via the switch SW4 and the capacitor C1, thereby establishing the first output voltage $V_{OUT1}$ at the first output end OUT1, wherein the corresponding energy path is designated by a dotted arrow symbol P2. Therefore, the second operation phase is the positive output energizing operation phase of the SIBO power converting circuit 106, wherein the discharging slope of the inductor current $I_L$ is equal to $V_{OUT1}/L$.

In the third operation phase of the SIBO power converting circuit 106, the control circuit 20 is configured to output the control signals S0, S3 and S5 having respective enable levels for turning on the switches SW0, SW3 and SW5 and output the control signals S1, S2 and S4 having respective disable levels for turning off the switches SW1, SW2 and SW4. Under such circumstance, the energy stored in the inductor L may be transmitted to the ground level GND via the switch SW3. In other words, the energy stored in the inductor L may charge the capacitor C2 via its second end, thereby establishing the second output voltage $V_{OUT2}$ at the second output end OUT2, wherein the corresponding energy path is designated by a dotted arrow symbol P3 and the discharging slope of the inductor current $I_L$ in the third operation phase is equal to $(V_{OUT2}+V_{IN})/L$.

Each of the SIBO power converting circuits 101-106 according to an embodiment of the present invention may be applied to a display device or an audio amplifier, but is not limited thereto.

In an embodiment of the present invention, each of the switches SW0-SW6 may be a metal-oxide-semiconductor field-effect transistor (MOSFET), a bipolar junction transistor (BJT), or another device with similar function. For N-type transistors, the enable level is logic 1 and the disable level is logic 0; for P-type transistors, the enable level is logic 0 and the disable level is logic 1. However, the types of the switches SW0-SW6 do not limit the scope of the present invention.

In conclusion, the present SIBO power converting circuit may provide different energy paths using a single inductor and multiple switches, thereby converting the input voltage into two output voltages having opposite polarities. Meanwhile, the present SIBO power converting circuit can improve its power conversion efficiency using a path control device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A single-inductor bipolar-output (SIBO) power converting circuit, comprising:
an input end for receiving an input voltage;
a first output end for outputting a first output voltage;
a second output end for outputting a second output voltage;
a first node;
a second node;
a third node;
a first switch, including:
a first end coupled to the input end;
a second end coupled to the first node; and
a control end for receiving a first control signal;
a second switch, including:
a first end coupled to the second node;
a second end coupled to a ground level; and
a control end for receiving a second control signal;
a third switch, including:
a first end coupled to the third node;
a second end coupled to the ground level; and
a control end for receiving a third control signal;
a fourth switch, including:
a first end coupled to the third node;
a second end coupled to the first output end; and
a control end for receiving a fourth control signal;
a fifth switch, including:
a first end coupled to the second node;
a second end coupled to the second output end; and
a control end for receiving a fifth control signal;
a path control device coupled between the first node and the second node and configured to adjust a voltage difference between the first node and the second node;
an inductor coupled between the first node and the third node;

a first capacitor, including:
a first end coupled to the first output end; and
a second end coupled to the ground level;
a second capacitor, including:
a first end coupled to the second output end; and
a second end coupled to the ground level; and
a control circuit configured to provide the first control signal, the second control signal, the third control signal, the fourth control signal and the fifth control signal.

2. The SIBO power converting circuit of claim 1, wherein the path control device comprises a first flying capacitor which includes:
a first end coupled to the first node; and
a second end coupled to the second node.

3. The SIBO power converting circuit of claim 2, wherein the path control device further comprises at least one resistor coupled between the first node and the first end of the first flying capacitor, or coupled between the second node and the second end of the first flying capacitor.

4. The SIBO power converting circuit of claim 2, further comprising:
a sixth switch, including:
a first end coupled to the first end of the fourth switch;
a second end coupled to the input end; and
a control end for receiving a sixth control signal; and
a second flying capacitor, including:
a first end coupled to the first end of the fourth switch; and
a second end coupled to the third node, wherein the control circuit is further configured to provide the sixth control signal.

5. The SIBO power converting circuit of claim 2, further comprising:
a first adjustable voltage source coupled between the second end of the second switch and the ground level and configured to provide a first compensation voltage based on a seventh control signal, wherein the control circuit is further configured to provide the seventh control signal.

6. The SIBO power converting circuit of claim 2, further comprising:
a sixth switch, including:
a first end coupled to the second end of the fourth switch;
a second end; and
a control end for receiving a sixth control signal; and
a second flying capacitor, including:
a first end coupled to the first end of the fourth switch; and
a second end coupled to the third node;
a first adjustable voltage source coupled between the second end of the second switch and the ground level and configured to provide a first compensation voltage based on a seventh control signal; and
a second adjustable voltage source coupled between the second end of the sixth switch and the ground level and configured to provide a second compensation voltage based on an eighth control signal, wherein the control circuit is further configured to provide the seventh control signal and the eighth control signal.

7. The SIBO power converting circuit of claim 1, wherein:
the control circuit is further configured to provide a ninth control signal; and
the path control device comprises a seventh switch which includes:

a first end coupled to the first node;

a second end coupled to the first node; and a control end for receiving the ninth control signal.

8. The SIBO power converting circuit of claim 1, wherein:

the first control signal periodically switches between a first enable level and a first disable level based on a first duty cycle;

the second control signal periodically switches between a second enable level and a second disable level based on a second duty cycle;

the third control signal periodically switches between a third enable level and a third disable level based on a third duty cycle;

the fourth control signal periodically switches between a fourth enable level and a fourth disable level based on a fourth duty cycle;

the fifth control signal periodically switches between a fifth enable level and a fifth disable level based on a fifth duty cycle; and the control circuit is further configured to adjust the first duty cycle, the second duty cycle, the third duty cycle, the fourth duty cycle and the fifth duty cycle based on the input voltage, the first output voltage and the second output voltage.

9. The SIBO power converting circuit of claim 1, configured to output the first output voltage and the second output voltage for driving a display panel or an audio amplifier.

10. The SIBO power converting circuit of claim 1, wherein the first output voltage is a positive voltage and the second output voltage is a negative voltage.

11. A method of controlling a single-inductor bipolar-output (SIBO) power converting circuit which comprises an input end for receiving an input voltage, a first output end for outputting a first output voltage, a second output end for outputting a second output voltage, a first node, a second node, a third node, a first switch coupled between the input end and the first node, a second switch coupled between the second node and a ground level, a third switch coupled between the third node and the ground level, a fourth switch coupled between the third node and the first output end, a fifth switch coupled between the second node and the second output end, a first flying capacitor coupled between the first node and the second node, an inductor coupled between the first node and the third node, a first capacitor coupled between the first output end and the ground level, and a second capacitor coupled between the second output end and the ground level, comprising:

turning on the first switch, the second switch and the third switch and turning off the fourth switch and the fifth switch during a first operation phase, thereby allowing the input voltage to charge the inductor and the first flying capacitor;

turning on the first switch and the fourth switch and turning off the second switch, the third switch and the fifth switch during a second operation phase, thereby allowing energy stored in the inductor to charge the first capacitor for establishing the first output voltage at the first output end; and turning on the third switch and the fifth switch and turning off the first switch, the second switch and the fourth switch during a third operation phase, thereby allowing energy stored in the inductor and the first flying capacitor to charge the second capacitor for establishing the second output voltage at the second output end.

12. The method of claim 11, further comprising:

disposing at least one resistor between the first node and the first end of the first flying capacitor, or between the second node and the second end of the first flying capacitor.

13. The method of claim 11, further comprising:

providing a first compensation voltage at the second node during the second operation phase, wherein a level of the first compensation voltage is higher than the ground level.

14. The method of claim 11, wherein the SIBO power converting circuit further comprises a sixth switch coupled between the input end and the first end of the fourth switch and a second flying capacitor coupled between the first end of the fourth switch and the third node, the method further comprising:

turning on the sixth switch during the first operation phase, thereby allowing the input voltage to charge the second flying capacitor;

turning off the sixth switch during the second operation phase, thereby allowing energy stored in the second flying capacitor to reduce a root mean square current of the inductor; and turning off the sixth switch during the third operation phase.

15. The method of claim 11, wherein the SIBO power converting circuit further comprises a second flying capacitor coupled between the first end of the fourth switch and the third node, the method further comprising:

providing a second compensation voltage at the first end of the fourth switch during the first operation phase, wherein a level of the second compensation voltage is higher than the ground level.

16. The method of claim 11, further comprising:

outputting a first control signal which periodically switches between a first enable level and a first disable level based on a first duty cycle for selectively turning on or turning off the first switch;

outputting a second control signal which periodically switches between a second enable level and a second disable level based on a second duty cycle for selectively turning on or turning off the second switch;

outputting a third control signal which periodically switches between a third enable level and a third disable level based on a third duty cycle for selectively turning on or turning off the third switch;

outputting a fourth control signal which periodically switches between a fourth enable level and a fourth disable level based on a fourth duty cycle for selectively turning on or turning off the fourth switch; and outputting a fifth control signal which periodically switches between a fifth enable level and a fifth disable level based on a fifth duty cycle for selectively turning on or turning off the fifth switch.

17. The method of claim 16, further comprising:

adjusting the first duty cycle, the second duty cycle, the third duty cycle, the fourth duty cycle and the fifth duty cycle based on the input voltage, the first output voltage and the second output voltage.

18. The method of claim 11, further comprising: outputting the first output voltage and the second output voltage to drive a display panel or an audio amplifier.

* * * * *